Dec. 16, 1958  J. PICKLES  2,864,636
WEDGE TYPE LOCK
Filed Feb. 27, 1956  3 Sheets-Sheet 1
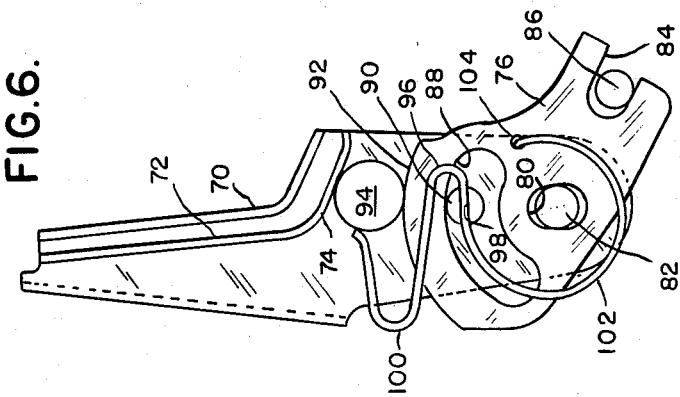
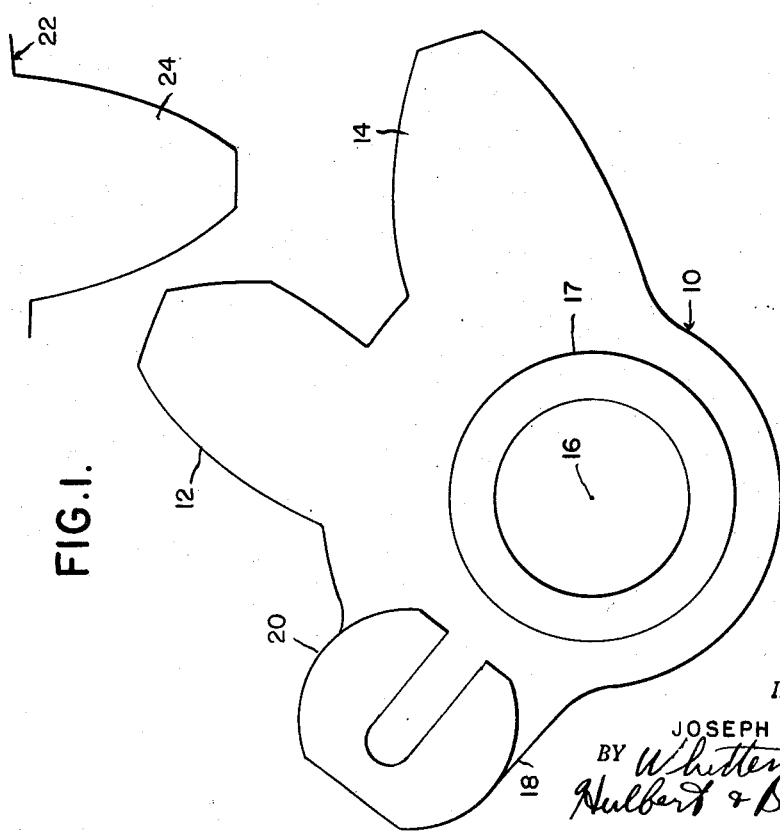
INVENTOR.
JOSEPH PICKLES
BY Whittemore,
Hulbert & Belknap
ATTORNEYS Dec. 16, 1958   J. PICKLES   2,864,636
WEDGE TYPE LOCK
Filed Feb. 27, 1956   3 Sheets-Sheet 2
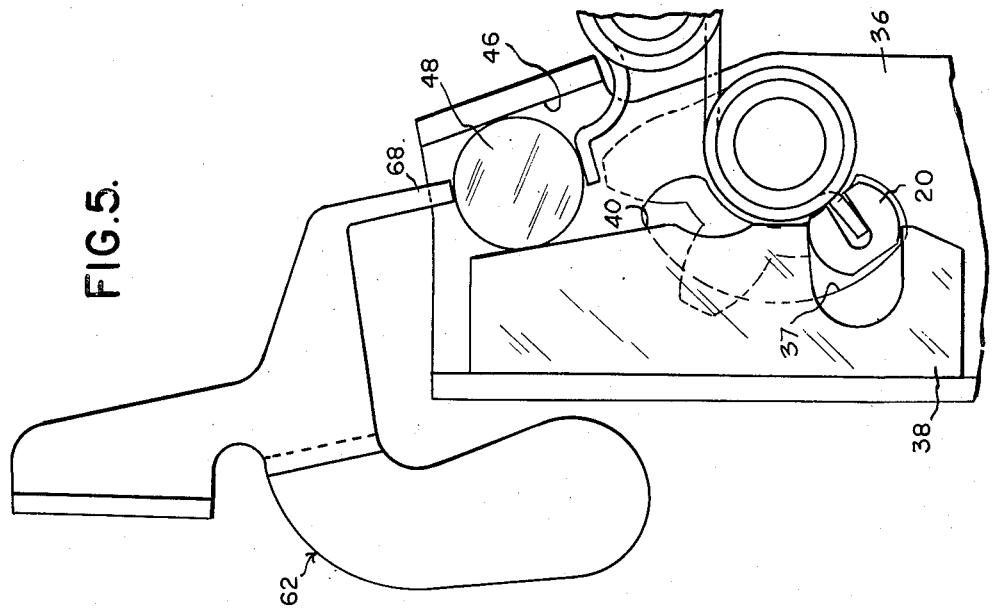
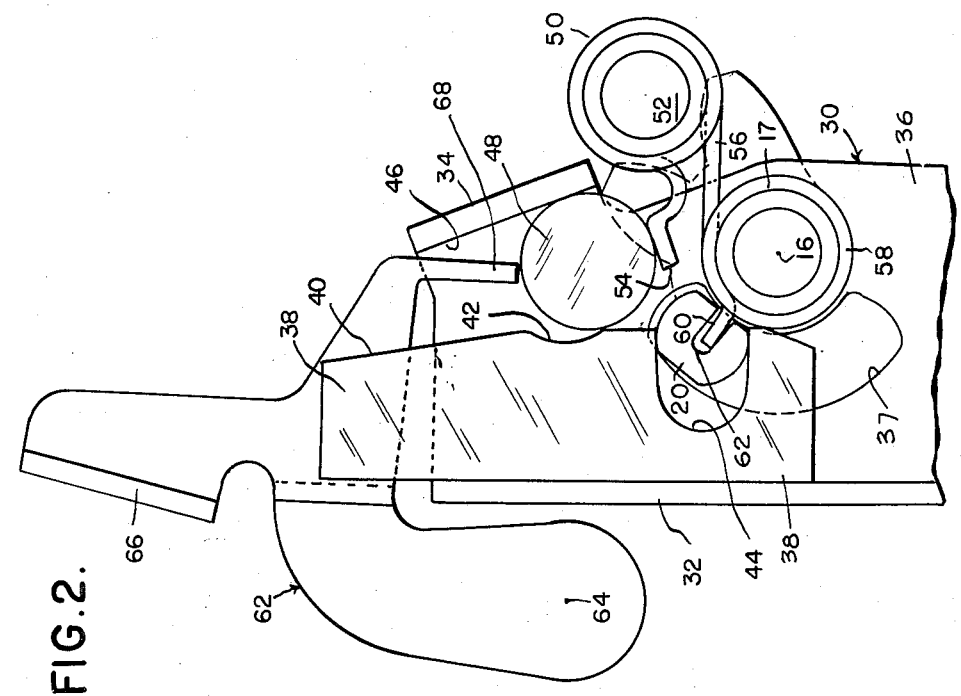
INVENTOR.
JOSEPH PICKLES
BY Whittemore
Hulbert & Belknap
ATTORNEYS Dec. 16, 1958   J. PICKLES   2,864,636
WEDGE TYPE LOCK Filed Feb. 27, 1956   3 Sheets-Sheet 3

INVENTOR.
JOSEPH PICKLES
BY *Whittemore,*
*Hulbert & Belknap*
ATTORNEYS

United States Patent Office 2,864,636
Patented Dec. 16, 1958

2,864,636

WEDGE TYPE LOCK

Joseph Pickles, Dearborn, Mich., assignor to Ferro Stamping Company, Detroit, Mich., a corporation of Michigan Application February 27, 1956, Serial No. 567,780

25 Claims. (Cl. 292—216)

The present invention relates to a wedge type lock and more particularly, a lock of this type adapted for use on an automotive vehicle.

It is an object of the present invention to provide a wedge type lock characterized in relatively large angular movement in a wedging zone.

It is a further object of the present invention to provide a wedge type lock which includes follow up mechanism effective to prevent reverse rotation of a rotary latching element through a substantial angular zone.

More specifically, it is an object of the present invention to provide a wedge type lock including a rotary latching element, a pair of confronting inclined surfaces one of which is movable with or as a result of movement of the latching element, a movable wedge element disposed between the surfaces, and resilient means urging the wedge element into wedging engagement.

Still more specifically, the present invention relates to a wedge type lock including a rotary latch element, a rectilinearly slidable block having a first wedge surface thereon, said lock having a stationary part provided with a second wedge surface confronting said first wedge surface, a movable wedge element received between said surfaces, means connecting said rotary latch element and said block for effecting rectilinear sliding movement of the block upon rotary movement of the latch element, resilient means urging the latch element into wedging engagement with said wedge surfaces, and manually operable means for releasing said wedge element.

It is a further object of the present invention to provide a lock as described in the preceding paragraph in which the manually operable release means comprises a member engageable directly with the wedge element for moving the wedge element out of wedged engagement between said wedge surfaces.

Other objects and features of the invention will become apparent as the description proceeds, especially when taken in conjunction with the accompanying drawings, wherein:

Figure 1 is an elevational view showing the relationship between a rotary latch element and a stationary keeper.

Figure 2 is a diagrammatic view showing the relationship of the latch control elements in released position.

Figure 5 is a diagrammatic view showing the position of the parts at the end limit of follow up wedging action.

Figure 6 is an elevational view illustrating another embodiment of the present invention.

Figure 4:
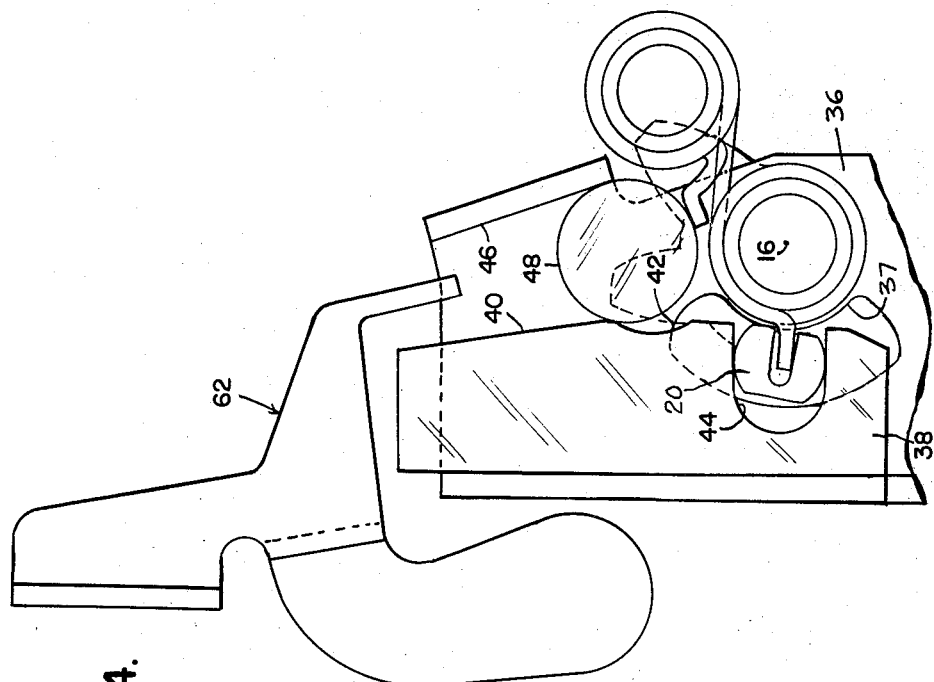
Figure 4 is a diagrammatic view showing the parts in the position occupied at the beginning of follow up wedging action.

Referring to Figure 1 the lock is illustrated as comprising a latch rotor 10 having teeth 12 and 14. The tooth 12 may be considered as an actuating tooth and the tooth 14 as an actual latching tooth. In use the rotor 10 is mounted on the edge of a door or the jamb of a door frame. The rotor is mounted for rotation about a fixed axis 16 and extending from one side of the rotor is a circular part 17. Carried by the rotor 10 is an arm 18 having a projection 20 thereon the opposite curved sides of which are preferably concentric.

The rotor 10 cooperates with a fixed keeper 22 which is illustrated as comprising a single stationary tooth 24. The keeper 22 is mounted in a fixed position on the jamb of the door frame if the rotor is mounted on the edge of the door, and vice-versa. The stationary tooth 24 is in position to be engaged by the tooth 12 as the door moves toward closed position, or to the right as seen in Figure 1. This results in counterclockwise rotation of the rotor 10 and brings the tooth 14 into engagement with the tooth 24. Suitable means later to be described, are provided which prevent reverse or clockwise rotation of the rotor 10 unless manually released, and this means comprises follow up wedge means so that the rotor 10 is held against reverse rotation from any position throughout a substantial angular zone.

In use the door is moved toward closed position against suitable stop means such for example as resilient bumpers. If wear takes place or if vibration tends to produce movement of the door during travel of the automotive vehicle, the rotor is further rotated and the wedge means follows up so as to prevent reverse rotation of the rotor. Thus, the door is firmly held against reverse rotation throughout a substantial zone and looseness and rattling is effectively prevented.

Referring now to Figure 2, the latch construction comprises a frame or support plate 30 having a guide flange 32 projecting upwardly therefrom and at the opposite edge of the plate 30 is a second guide flange 34. The latch rotor 10 is mounted for rotation on the flat intermediate portion 36 of the plate 30 with the teeth 12 and 14 at the rear thereof as seen in Figures 2–5. Projection 20 extends through a slot 37 in the portion 36. Slidably carried on the plate 30 is a block 38 having an inclined wedge surface 40, an arcuate recess 42, and a relatively deep notch 44 the opposite sides of which are parallel. The projection 20 of the rotor is received in the notch 44, the opposite parallel sides of which are spaced apart a distance slightly greater than the diameter of the arcuate portions of the projection 20. It will be apparent that rotation of the rotor 10 about its axis 16 results in vertical movement of the block 38 as seen in Figures 2–5.

The flange 34 has an inner wedging surface 46 and between this wedging surface 46 and the wedging surface 40 of the block 38 is a wedge element 48 which is illustrated as in the form of a flat circular disc.

The lock includes resilient means affecting movement of the wedge element 48 and of the block 38, and this means comprises a spring 50 coiled about a stationary support 52 which may if desired be provided as a part of the frame 30 or which may be a separate element mounted in the position shown and carried by the door or door frame as the case may be. The spring 50 includes an arm 54 engaging the underside of the wedge element 48 as seen in Figures 2–5, and urging the wedging element towards wedging engagement between the wedge surfaces 40 and 46. The spring includes another portion 56 having a convolution 58 wound around the circular part 17 and terminating in a finger 60 which is received within an opening 62 provided in the projection 20. The spring portion 56 including the finger 60 is biased so as to produce a clockwise rotative force on the projection 20 of the rotor 10, as seen in Figure 2, this force also being clockwise of the rotor as seen in Figure 1 and tending to establish a force between teeth 12 and 24 tending to rotate the rotor 10 in a direction which releases the door and moves the door toward open position. At the same time, the clockwise bias established for the projection 20 tends to move the block 38 upwardly as seen in Figures 2-5.

In order to control the lock and to effect a release of the rotor so that the door may be opened, there is provided a release lever 62 which is pivoted on a fixed axis indicated at 64 and which includes a flange portion 66 by means of which the lever 62 may be rotated in a clockwise direction. It will be appreciated that the lever 62 may be actuated in the usual manner by a door handle and will be associated with the usual push button control mechanism as well as the cylinder lock mechanism.

Since the wedge type lock disclosed herein may be in locked engagement with the latch rotor 10 in different rotative positions, the lever 62 is ordinarily associated with resilient means holding it in a fixed retracted position as determined by the door handle.

The lever 62 includes a wedge release finger 68 movable into engagement with the wedge 48 to move the same toward the large end of the space between the wedge surfaces 40 and 46 which of course releases the block 38 for upward movement and simultaneously permits clockwise rotation of the latch element by spring finger 60 to a release position with respect to the stationary keeper 22.

In Figure 2 the lever 62 has been swung clockwise to release position and the wedge element or disc 48 has been moved downwardly to a limiting position against the action of the spring arm 54. At the same time, the door will have been opened and the coaction between the teeth 12 and 14 of the rotor and the stationary tooth 24 of the keeper is such that this opening movement of the door has rotated the rotor 10 in a clockwise direction to a position illustrated in Figure 1. At the same time, this rotation of the rotor has been assisted by the spring finger 60 which has also assisted in upward movement of the wedge block 38 to the position shown in Figure 2.

Figure 3:
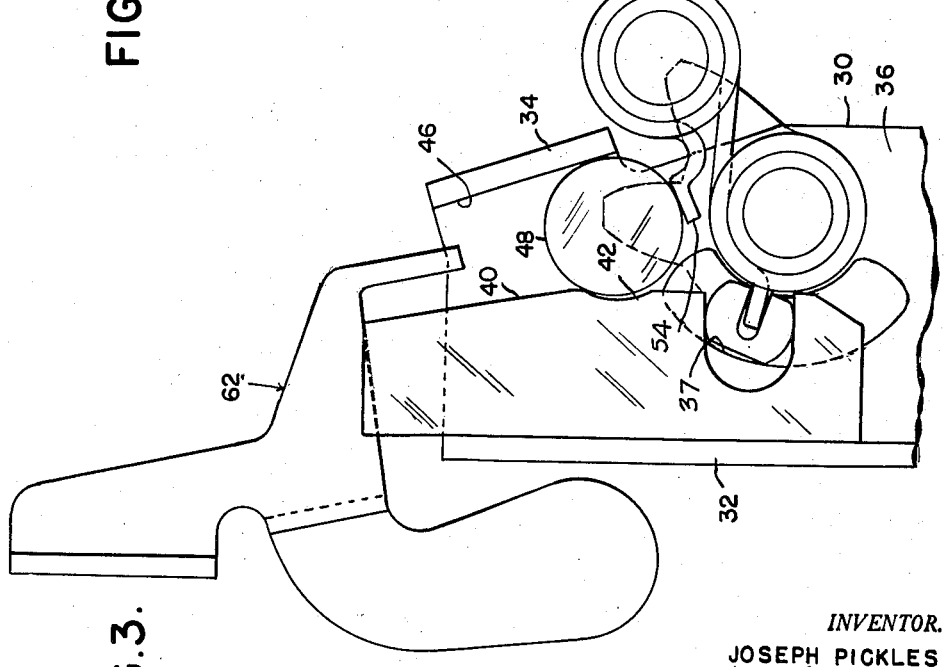
Figure 3 is a diagrammatic view showing the latch control elements in the position assumed as the door is moved to closed position.

An intermediate position of this rotor is illustrated in Figure 3 and in this position it will be observed that the counterclockwise rotation of the rotor has resulted in some downward movement of the block 38 which has permitted the wedge element 48 to move into the recess 42. This is the safety position in which the disc 48 becomes effectively unitary with the block 38.

Further closing movement of the door results in further downward movement of the block 38 to the position shown in Figure 4, the wedge element assuming the position illustrated which is on the upper edge of the recess 42. In other words, any additional downward movement of the block 38 accompanied by counterclockwise rotation of the rotor 10 and its portion 20 will result in the wedge element entering into initial wedging engagement between the surfaces 40 and 46. This corresponds to the beginning of an operating zone in which the wedge element 48 is effective to follow up as a result of any counterclockwise rotation of the rotor 10, to enter into wedging engagement in different positions between the surfaces 40 and 46, and thus to effectively prevent any reverse rotation of the rotor 10 toward released position.

It will be observed in Figure 4 that the effective center of the portion 20 of the rotor 10 is displaced horizontally to the left of the axis 16 of the latch rotor 10.

In Figure 5 there is illustrated the other limiting position in which the block 38 is in its lowermost position, the wedge element or disc 48 is in its extreme upward position against the lower end of the finger 68, and the latch rotor 10 is rotated approximately 30 degrees counterclockwise from the position illustrated in Figure 4. Thus, it is apparent that the latch rotor 10 has some 30 degrees of angular movement during which its counterclockwise rotation is followed up by the wedge element in a manner to prevent reverse rotation thereof.

With the parts in the relationship illustrated in Figure 5, or in any position intermediate those illustrated in Figures 4 and 5, clockwise rotation of the lever 62 will result in mechanical movement of the wedge or disc 48 downwardly out of wedging engagement with the wedge surfaces 40 and 46, and if the lever 62 is moved to the position illustrated in Figure 2, the door may be opened mechanically, which will result in rotation of the latch rotor 10 toward the position shown in Figure 1.

An essential feature of the present invention is the relatively large angular zone of rotation of the latch element in which the follow up action occurs. This is due to the fact that the block 38 has sliding engagement with the flange 32. This permits the wedge surface 40 to be inclined with respect to the surface of the guide flange 32 and permits the wedge surface 46 of the flange 34 to be disposed at a substantially greater angle to the path of movement of the block 38 than would otherwise be the case. This permits an increase in the angular zone of movement of the rotor during which wedging can take place without an increase in dimensions of the structure.

Referring now to Figure 6 there is illustrated a second embodiment of the present invention. In this case the lock structure comprises a stationary frame 70 having a rib 72 thereon having a cam surface portion 74. A movable wedge member 76 is provided having an elongated opening 80 in which it is movably mounted on a support pin 82 carried by the frame 70. The wedge member 76 is connected to a latch element such as illustrated in Figure 1, by means of a notch 84 corresponding to the notch 44. In this case however, the actuating portion 86 corresponding to the portion 20 of the rotor 10 results in substantial angular movement of the wedge member 76 about the axis of the pin 82, rather than the rectilinear movement resulting from the constructions shown in Figures 2-5.

The wedge member 76 includes an angular enlarged opening 88 in which is received a fixed pin 90 carried by the support 70. The wedge member 76 includes a wedge surface 92 confronting the wedge surface 74, these surfaces being shaped to approach each other to the right as seen in Figure 6. Located between the wedge surfaces 74 and 82 is a wedge element 94 which again is illustrated as comprising a flat disc.

A bias spring indicated generally at 96 is provided and is illustrated as received in a slot 98 formed in the pin 90. The spring 96 includes an arm 100 the end of which engages the wedge 94 and tends to move it into wedging engagement between the wedge surfaces 74 and 92, to prevent clockwise rotation of the wedge member 76. The spring 96 includes the arm 102 having its end received in an opening 104 in the wedge member 76 and tending to rotate it in a clockwise direction.

Again, with the parts wedged as illustrated in Figure 6, all clockwise rotation of the wedge member 76 and hence all opening movement of the latch rotor carrying the actuating portion 86, is effectively prevented.

In order to release the rotor to permit opening movement of the door, suitable means such for example as that illustrated in Figures 2-5 may be provided for effecting direct engagement with the disc 94 and moving it to the left toward release position from the wedging position seen in Figure 6.

It will be observed that the lock construction shown in Figure 6 has in common with the previously described embodiment of the invention the fact that the portion of the wedge member 76 between the wedge 74 and the stationary pin 90 has frictional engagement with both the wedge 74 and the pin 90. This corresponds to the frictional engagement between the sides of the block 38 with the flange 32 and the wedge 48, as seen in Figures 2-5, and permits the wedging action of the rotor to be operative throughout a large angular zone of movement thereof. The basic result is obtaining an angle in the construction which is approximately twice as great as the friction angle of the materials employed since the friction is operative at opposite sides of the movable member; that is, the block 38 in Figure 2 and the wedge member 76 in Figure 6.

The drawings and the foregoing specification constitute a description of the improved wedge type lock in such full, clear, concise and exact terms as to enable any person skilled in the art to practice the invention, the scope of which is indicated by the appended claims.

What I claim as my invention is:

1. A door latch comprising a frame, a latch rotor mounted for rotation on said frame, a block slidable on said frame, means connecting said rotor and block to cause sliding movement of said block upon rotation of said rotor, said frame having a wedge engaging surface spaced from an edge surface of said block, a wedge located between said wedge engaging surface and the said edge surface of said block, said surfaces being inclined to form a space which narrows in the direction in which said block is slidable upon rotation of said latch rotor in unlatching direction, resilient means urging said wedge toward the narrowing end of the said space, and manual means for releasing said wedge.

2. A latch as defined in claim 1 in which the means connecting said rotor and block comprises an arm on said rotor, and abutment surfaces on said block between which the end of said arm is movable.

3. A latch as defined in claim 1 in which said resilient means is a spring, said spring having a portion engageable with said rotor and operable to bias said rotor in unlatching direction.

4. A latch as defined in claim 1 in which said resilient means is a hairpin type spring, said spring having opposite ends engaged between said wedge and the arm of said rotor and operable to bias said rotor in unlatching direction.

5. A latch comprising a frame, a straight guideway on said frame, a slide movable along said guideway, a wedge surface on said frame spaced from and inclined with respect to an edge surface of said slide, a movable wedge located between said edges and engageable therebetween to limit movement of said slide in one direction, a resilient means urging said wedge into engagement with said surfaces, manual means engageable with said wedge to move said wedge out of wedging engagement with said surfaces, and a latch rotor on said frame coupled to said slide for rotation upon movement of said slide on said frame.

6. A latch comprising a frame, a straight guideway on said frame, a slide movable along said guideway, a wedge surface on said frame spaced from and inclined with respect to an edge surface of said slide, a movable wedge located between said edges and engageable therebetween to limit movement of said slide in one direction, resilient means urging said wedge into engagement with said surfaces, manual means engageable with said wedge to move said wedge out of wedging engagement with said surfaces, and a latch rotor on said frame coupled to said slide for rotation upon movement of said slide on said frame, said slide having a recess in its said surface, said wedge being received in said recess when moved to the position corresponding to safety position of said rotor.

7. A latch comprising a frame, a straight guideway on said frame, a slide movable along said guideway, a wedge surface on said frame spaced from and inclined with respect to an edge surface of said slide, a movable wedge located between said edges and engageable therebetween to limit movement of said slide in one direction, resilient means urging said wedge into engagement with said surfaces, manual means engageable with said wedge to move said wedge out of wedging engagement with said surfaces, and a latch rotor on said frame coupled to said slide for rotation upon movement of said slide on said frame, said slide having a recess in its said surface, said wedge being received in said recess when moved to the position corresponding to safety position of said rotor, and resilient means urging said rotor toward unlatched position.

8. A latch comprising a frame, a straight guideway on said frame, a slide movable along said guideway, a wedge surface on said frame spaced from and inclined with respect to an edge surface of said slide, a movable wedge located between said edges and engageable therebetween to limit movement of said slide in one direction, resilient means urging said wedge into engagement with said surfaces, manual means engageable with said wedge to move said wedge out of wedging engagement with said surfaces, a latch rotor on said frame coupled to said slide for rotation upon movement of said slide on said frame, said slide having a recess in its said surface, said wedge being received in said recess when moved to the position corresponding to safety position of said rotor, and resilient means urging said rotor toward unlatched position, said last mentioned resilient means being ineffective to move said latch rotor from latched position.

9. A latch comprising a frame, a straight guideway on said frame, a slide movable along said guideway, a wedge surface on said frame spaced from and inclined with respect to an edge surface of said slide, a movable wedge located between said edges and engageable therebetween to limit movement of said slide in one direction, resilient means urging said wedge into engagement with said surfaces, manual means engageable with said wedge to move said wedge out of wedging engagement with said surfaces, a latch rotor on said frame having lobes engageable with a keeper and rotatable thereby from unlatched position into a latched zone upon movement of a door with which said latch and keeper are associated from open to closed position and vice-versa, and means coupling said slide and rotor for simultaneous movement.

10. A latch comprising a frame, a straight guideway on said frame, a slide movable along said guideway, a wedge surface on said frame spaced from and inclined with respect to an edge surface of said slide, a movable wedge located between said edges and engageable therebetween to limit movement of said slide in one direction, resilient means urging said wedge into engagement with said surfaces, manual means engageable with said wedge to move said wedge out of wedging engagement with said surfaces, a latch rotor on said frame having lobes engageable with a keeper and rotatable thereby from unlatched position into a latched zone upon movement of a door with which said latch and keeper are associated from open to closed position and vice-versa, means coupling said slide and rotor for simultaneous movement, and resilient means urging said rotor toward unlatched position.

11. A latch as defined in claim 10 in which both of said resilient means comprises a single spring connecting said wedge and rotor.

12. A latch comprising a latch rotor rotatable between an unlatched position and a latching zone, means movable by said rotor upon rotation thereof and having opposed edge surfaces, fixed guide means slidably engaged by one of said edge surfaces, a wedge surface spaced from and inclined with respect to the other edge surface, and a wedge movably received between the said other edge surface and said wedge surface.

13. A latch as defined in claim 12 comprising resilient means urging said rotor away from latched position and urging said wedge toward wedging engagement.

14. A latch as defined in claim 12 comprising resilient means biasing said wedge in wedging direction, and manual means for moving said wedge in release direction.

15. A latch as defined in claim 12, the inclination of said wedge surface being in a direction relative to said other edge surface as to cause said wedge to wedge therebetween to oppose movement of said rotor toward unlatched position.

16. A latch as defined in claim 15, resilient means biasing said wedge toward wedge position, and manual means for moving said wedge toward release position.

17. A latch as defined in claim 12 in which said wedge comprises a circular disc.

18. A latch comprising a rotor, rotor wedging structure comprising a support, a plate pivoted to said support with provision for lateral movement relative to its pivot axis, said plate having an arcuate slot concentric with the pivot axis of said plate, a fixed abutment carried by said support and engaging the radially outer edge of said slot, a wedge surface spaced from an edge of said plate beyond the slot from the axis thereof, a movable wedge between the wedge surface and the edge surface of said plate, said plate being rotatable with said rotor.

19. A latch comprising a rotor, rotor wedging structure comprising a support, a plate pivoted to said support with provision for lateral movement relative to its pivot axis, said plate having an arcuate slot concentric with the pivot axis of said plate, a fixed abutment carried by said support and engaging the radially outer edge of said slot, a wedge surface spaced from an edge of said plate beyond the slot from the axis thereof, a movable wedge between the wedge surface and the edge surface of said plate, said plate being rotatable with said rotor, and a manual release member operable to engage said wedge member.

20. A latch comprising a rotor, rotor wedging structure comprising a support, a plate pivoted to said support with provision for lateral movement relative to its pivot axis, said plate having an arcuate slot concentric with the pivot axis of said plate, a fixed abutment carried by said support and engaging the radially outer edge of said slot, a wedge surface spaced from an edge of said plate beyond the slot from the axis thereof, a movable wedge between the wedge surface and the edge surface of said plate, said plate being rotatable with said rotor, a manual release member operable to engage said wedge member, and resilient means urging said plate away from latched position and urging said wedge in a wedging direction.

21. In a lock, a frame, a latch rotor pivoted to said frame, a guide surface on said frame, a member having a first surface slidable against said guide surface in frictional relation, means connecting said rotor and member for movement of said member upon rotation of said rotor, a wedge surface on said frame, said member having a second surface facing away from its first surface and spaced from and inclined to the wedge surface on said frame, a wedge movably received between said wedge surface and second surface, resilient means urging said wedge into wedging engagement between said surfaces, and manually operable means to move said wedge out of wedging engagement.

22. In a door latch, a frame, a latch rotor mounted on said frame for angular movement into and out of a latching zone of substantial angular extent, a member movable with said rotor and having a first wedge surface, stationary means on said frame providing a second wedge surface spaced from said first surface, the spacing between said surfaces diminishing gradually in the direction in which said first surface moves upon movement of said latch rotor from latched toward unlatched position, support means for said member preventing movement of said member in a direction away from the second wedge surface, a wedge element disposed between said wedge surfaces, resilient means urging said wedge element toward the narrower end of the space between said wedge surfaces in wedging engagement therewith, and manually operated means engageable with said wedge element to move it out of wedging engagement.

23. In a door latch, a frame, a latch rotor mounted on said frame for limited back and forth angular movement into and out of a latching zone of substantial angular extent, a member movable with said rotor and having a first wedge surface, stationary means on said frame providing a second wedge surface spaced from said first surface, the spacing between said surfaces diminishing gradually in the direction in which said first surface moves upon movement of said latch rotor from latched toward unlatched position, support means for said member preventing movement of said member in a direction away from the second wedge surface, a wedge element disposed between said wedge surfaces, resilient means urging said wedge element toward the narrower end of the space between said wedge surfaces in wedging engagement therewith, and manually operated means engageable with said wedge element to move it out of wedging engagement.

24. In a door latch, a frame, a latch rotor mounted on said frame for limited back and forth angular movement into and out of a latching zone of substantial angular extent, a member movable with said rotor and having a first wedge surface, stationary means on said frame providing a second wedge surface spaced from said first surface, the spacing between said surface diminishing gradually in the direction in which said first surface moves upon movement of said latch rotor from latched toward unlatched position, support means for said member preventing movement of said member in a direction away from the second wedge surface, resilient means biasing said latch rotor in latch release direction, a wedge element disposed between said wedge surfaces, resilient means urging said wedge element toward the narrower end of the space between said wedge surfaces in wedging engagement therewith, and manually operated means engageable with said wedge element to move it out of wedging engagement.

25. In a door latch, a frame, a latch rotor mounted on said frame for limited back and forth angular movement into and out of a latching zone of substantial angular extent, a member movable with said rotor and having a first wedge surface, stationary means on said frame providing a second wedge surface spaced from said first surface, the spacing between said surfaces diminishing gradually in the direction in which said first surface moves upon movement of said latch rotor from latched toward unlatched position, support means for said member preventing movement of said member in a direction away from the second wedge surface, resilient means biasing said latch rotor in latch release direction, a wedge element in the form of a flat disc disposed between said wedge surfaces, resilient means urging said wedge element toward the narrower end of the space between said wedge surfaces in wedging engagement therewith, and manually operated means engageable with said wedge element to move it out of wedging engagement.

References Cited in the file of this patent

UNITED STATES PATENTS

| | | |
|---|---|---|
| 1,789,775 | Russ et al. | Jan. 20, 1931 |
| 2,246,782 | Dall | June 24, 1941 |
| 2,552,815 | Roethel | May 15, 1951 |
| 2,644,707 | Dall | July 7, 1953 |
| 2,673,757 | Marple | Mar. 30, 1954 |
| 2,712,957 | Marple | July 12, 1955 |